(12) United States Patent
Nakajima et al.

(10) Patent No.: US 12,209,362 B2
(45) Date of Patent: Jan. 28, 2025

(54) STEEL WIRE AND TIRE

(71) Applicant: SUMITOMO ELECTRIC INDUSTRIES, LTD., Osaka (JP)

(72) Inventors: Tetsuya Nakajima, Osaka (JP); Akifumi Matsuoka, Osaka (JP); Ken Manabe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/043,632

(22) PCT Filed: May 11, 2021

(86) PCT No.: PCT/JP2021/017912
§ 371 (c)(1),
(2) Date: Mar. 1, 2023

(87) PCT Pub. No.: WO2022/085230
PCT Pub. Date: Apr. 28, 2022

(65) Prior Publication Data
US 2023/0374729 A1    Nov. 23, 2023

(30) Foreign Application Priority Data

Oct. 19, 2020    (WO) .................. PCT/JP2020/039289

(51) Int. Cl.
*B60C 9/00*    (2006.01)
*D07B 1/06*    (2006.01)

(52) U.S. Cl.
CPC .......... *D07B 1/0606* (2013.01); *B60C 9/0007* (2013.01)

(58) Field of Classification Search
CPC ....... B60C 9/00; B60C 9/0007; B60C 9/0064; D07B 1/0646; D07B 1/0666; D07B 1/062; D02G 3/48
See application file for complete search history.

(56) References Cited

U.S. PATENT DOCUMENTS

| 4,446,198 A | * | 5/1984 | Shemenski ........... B32B 15/015 152/565 |
| 2015/0376351 A1 | * | 12/2015 | Obana ....................... C08J 5/00 524/440 |
| 2022/0001696 A1 | | 1/2022 | Matsuoka et al. |

FOREIGN PATENT DOCUMENTS

| DE | 102015209343 A1 | * | 11/2016 |
| JP | H06-184965 | | 7/1994 |
| JP | 2006-336154 | | 12/2006 |
| JP | 2009-041170 | | 2/2009 |

(Continued)

*Primary Examiner* — Cedrick S Williams
(74) *Attorney, Agent, or Firm* — IPUSA, PLLC

(57) ABSTRACT

A steel wire having a cross section perpendicular to a longitudinal direction having a flat shape, and an outer shape of the cross section including a pair of linear parts opposing each other, and a pair of curved parts opposing each other and connecting the linear parts. The curved part includes a pair of first regions located at positions near the linear parts, and a second region located at a position between the pair of first regions, a radius of curvature, $R_1$ of the first region is greater than or equal to 0.05 mm but less than 0.15 mm, and a radius of curvature, $R_2$ of the second region is greater than or equal to 0.13 mm but less than or equal to 0.2 mm, and an angle between the linear part and the curved part is greater than or equal to 165 degrees.

12 Claims, 4 Drawing Sheets

(56) References Cited

FOREIGN PATENT DOCUMENTS

| | | | |
|---|---|---|---|
| JP | 2009-249763 | 10/2009 | |
| JP | 2015-178301 | 10/2015 | |
| JP | 2018199837 A * | 12/2018 | |
| WO | WO-2018078877 A1 * | 5/2018 | |
| WO | WO-2018179597 A1 * | 10/2018 | ............. C22C 38/00 |
| WO | 2020/116047 | 6/2020 | |

\* cited by examiner

STEEL WIRE AND TIRE

This application is based upon and claims priority to International Application No. PCT/JP2020/039289 filed on Oct. 19, 2020 based on the Patent Cooperation Treaty, the entire contents of which are incorporated herein by reference.

TECHNICAL FIELD

The present disclosure relates to steel wires, and tires.

BACKGROUND ART

For example, Patent Document 1 discloses a pneumatic radial tire having a side reinforcing layer, disposed in a region from a bead part to a sidewall part, and including a plurality of single-core steel wires arranged in parallel and embedded in a rubber. The single-core steel wires have a flat shape with an aspect ratio of 40% to 70%, a long diameter of 0.80 mm or less, and an average spacing of 0.60 mm or greater. A product of a buckling load of each single-core steel wire and a wire mass per unit area of the side reinforcing layer is 400 N·kg/m$^2$ or greater.

PRIOR ART DOCUMENTS

Patent Documents

Patent Document 1: Japanese Laid-Open Patent Publication No. 2015-178301

DISCLOSURE OF THE INVENTION

A steel wire according to the present disclosure has a cross section perpendicular to a longitudinal direction having a flat shape; and
  an outer shape of the cross section including a pair of linear parts opposing each other, and a pair of curved parts opposing each other and connecting the linear parts, wherein
  the curved part includes a pair of first regions located at positions near the linear parts, and a second region located at a position between the pair of first regions,
  a radius of curvature, $R_1$ of the first region is greater than or equal to 0.05 mm but less than 0.15 mm, and a radius of curvature, $R_2$ of the second region is greater than or equal to 0.13 mm but less than or equal to 0.2 mm, and
  an angle between the linear part and the curved part is greater than or equal to 165 degrees.

MODE OF CARRYING OUT THE INVENTION

Figure 1A:
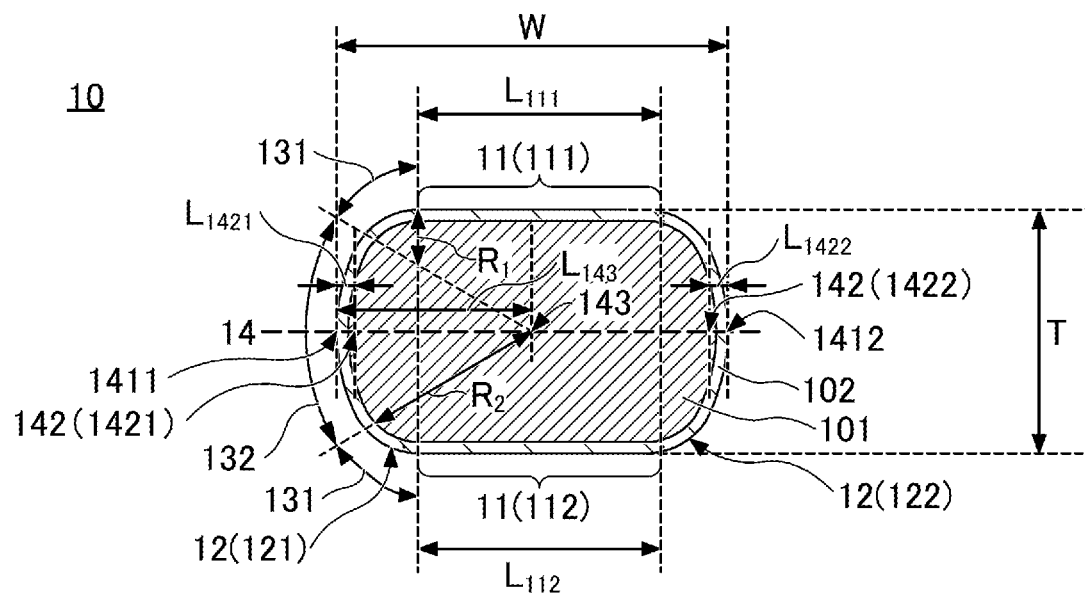
FIG. 1A is a cross sectional view of a steel wire according to one aspect of the present disclosure along a plane perpendicular to a longitudinal direction.

Problems to be Solved by the Present Disclosure

In addition to reducing weight in order to reduce a rolling resistance or the like of tires, for example, there are demands to improve a durability of the tires so as to reduce a tire replacing frequency and enable use of the tires for a long period of time. Steel wires are used in the tires, and there also are demands for steel wires capable of forming the tires having excellent lightweight properties and durability.

Accordingly, one object of the present disclosure is to provide a steel wire capable of forming a tire having excellent lightweight properties and durability.

Effects of the Present Disclosure

According to the present disclosure, it is possible to provide a steel wire capable of forming a tire having excellent lightweight properties and durability.

DESCRIPTION OF EMBODIMENTS OF THE PRESENT DISCLOSURE

First, embodiments of the present disclosure will be described in the following. In the following description, the same or corresponding elements are designated by the same reference numerals, and a repeated description of the same or corresponding elements will be omitted.

(1) A steel wire according to the present disclosure has a cross section perpendicular to a longitudinal direction having a flat shape; and
  an outer shape of the cross section including a pair of linear parts opposing each other, and a pair of curved parts opposing each other and connecting the linear parts, wherein
  the curved part includes a pair of first regions located at positions near the linear parts, and a second region located at a position between the pair of first regions,
  a radius of curvature, $R_1$ of the first region is greater than or equal to 0.05 mm but less than 0.15 mm, and a radius of curvature, $R_2$ of the second region is greater than or equal to 0.13 mm but less than or equal to 0.2 mm, and
  an angle between the linear part and the curved part is greater than or equal to 165 degrees.

The steel wire can be arranged in a belt layer of the tire, for example. The belt layer includes the steel wire and rubber, and the steel wire is embedded in the rubber. Because a thickness of the belt layer can be selected so that the steel wire can be embedded in the rubber, it is also possible to reduce the thickness of the belt layer by making a cross section perpendicular to the longitudinal direction of the steel wire (the cross section perpendicular to the longitudinal direction of the steel wire may hereinafter also be referred simply as the "cross section") have the flat shape, and reducing the thickness of the steel wire. Accordingly, by using the steel wire having the flat cross sectional shape, it is possible to reduce an amount of the rubber included in the belt layer, when compared to a case where the steel wire used has the same cross sectional area but a circular cross sectional shape, for example. For this reason, it is possible to reduce a weight of the belt layer, and also reduce a weight of the tire including the belt layer, by using the steel wire having the flat cross sectional shape.

However, according to studies conducted by the present inventors, in a conventional steel wire having a cross section with a flat shape, an outer shape of the cross section includes a linear part and a curved part, and an inclination greatly changes at a boundary portion between the linear part and the curved part. The inclination refers to an inclination of a tangential line of an outer shape in the cross section perpendicular to the longitudinal direction of the steel wire (hereinafter also simply referred to as the "inclination"). Hence, when the conventional steel wire having the flat shape is applied to the tire, a crack, originating from a boundary portion between the linear part and the curved part, is generated in the rubber, to thereby deteriorate the durability of the tire.

Hence, the present inventors conducted further studies. According to these studies, it is possible to reduce a change in the inclination at the boundary portion between the linear part and the curved part, by forming the first region and the second region in the curved part, and setting the radius of curvature of each of these regions within the respective range described above. For this reason, it was found that the generation of a crack in the rubber can be reduced, and the durability of the tire can be improved, in the case where the steel wire according to one aspect of the present disclosure satisfying such features and ranges described above is applied to the tire.

By setting the radius of curvature, $R_1$ of the first region greater than or equal to 0.05 mm as described above, it is possible to reduce a change in the inclination at the boundary portion between the linear part and the curved part. For this reason, when the steel wire is applied to the tire, it is possible to reduce the generation of the crack in the rubber, and improve the durability of the tire. By setting the radius of curvature, $R_1$ of the first region less than 0.15 mm, it is possible to secure the length of the linear part, and improve handling and stability of the tire using the steel wire.

By setting the radius of curvature, $R_2$ of the second region greater than or equal to 0.13 mm, it is possible to reduce an amount of processing to be performed when manufacturing the steel wire, and increase a strength of the steel wire. By setting the radius of curvature, $R_2$ of the second region less than or equal to 0.2 mm, it is possible to distribute a force applied along the direction of the thickness T of the steel wire, and improve the durability of the steel wire and the tire including the steel wire.

The steel wire can be processed into a predetermined shape by pressing and rolling a raw steel wire having a circular cross section perpendicular to the longitudinal direction, using a rolling roller, for example. For this reason, the amount of processing refers to an amount of processing amount to form the raw steel wire into a predetermined shape, that is, an amount of deformation.

By setting the angle formed between the linear part and the curved part to greater than or equal to 165 degrees, in addition to setting the radii of curvatures of the first region and the second region of the curved part to the respective ranges described above, it is possible to particularly reduce a large change in the inclination at the boundary portion between the linear part and the curved part. For this reason, it is possible to prevent the crack, originating from the boundary portion between the linear part and the curved part, from being generated in the rubber, and improve the durability of the tire.

(2) The radius of curvature, $R_1$ may be different from the radius of curvature, $R_2$.

When the radius of curvature, $R_1$ and the radius of curvature, $R_2$ are different, that is, when a relationship $R_1 \neq R_2$ is satisfied, it is possible to particularly reduce a change in the inclination at the boundary portion between the linear part and the curved part. For this reason, when the steel wire is applied to the tire, it is possible to particularly reduce the generation of the crack in the rubber, and further improve the durability of the tire.

(3) In the cross section,
two intersection points of a center line equidistant from the pair of opposing linear parts, and the pair of opposing curved parts, may be defined as a first end portion and a second end portion,
two points on the center line, that are separated by 0.1 mm from the first end portion and the second end portion, respectively, may be defined as surface-side measurement points,
a point on the center line, that is equidistant from the first end portion and the second end portion, may be defined as a center measurement point, and
a difference between an average value HV1 of Vickers hardnesses at the two surface-side measurement points, and a Vickers hardness HV2 at the center measurement point, denoted by HV1−HV2, may be greater than or equal to −60HV0.1 but less than or equal to −10HV0.1.

When the HV1−HV2 described above is less than or equal to −10HV0.1, the hardness of the central portion including the center measurement point of the steel wire is higher than the hardness of the surface side including the surface-side measurement point. By making the hardness of the central portion of the steel wire higher than the hardness of the surface side in this manner, the impact received by the linear part described above can be uniformly received by the entire surface including the linear part. In the case of a flattened steel wire, the impact resistance may decrease, but the impact resistance can be increased by using the steel wire having the hardness distribution described above.

However, the hardness of the central portion needs to be particularly increased, in order to make HV1−HV2 less than −60HV0.1. For this reason, an excessively large pressure needs to be applied when manufacturing the steel wire by flattening, and a material used for the steel wire may become brittle or the like. Hence, HV1−HV2 is preferably greater than or equal to −60HV0.1, as described above.

(4) A brass plating layer including copper and zinc may be provided on the surface.

In the following description, copper and zinc may be represented by chemical symbols Cu and Zn, respectively.

Because the steel wire according to the present disclosure has the brass plating layer including Cu and Zn, in a case where the steel wire is covered with rubber and vulcanized to form the tire, an adhesive layer including $Cu_2S$ can be formed on the rubber side of an interface between the steel wire and the rubber. Zn has a function of accelerating the formation of $Cu_2S$. By forming the adhesive layer, it is possible to increase an adhesion force between the steel wire and the rubber, and enable the tire to have a particularly excellent durability.

(5) The brass plating layer may further include one or more kinds of elements selected from cobalt, nickel, iron, tin, and bismuth.

Hereinafter, cobalt, nickel, iron, tin, and bismuth may be represented by chemical symbols Co, Ni, Fe, Sn, and Bi.

Co, Ni, Fe, Sn, and Bi have higher ionization tendencies than Zn. For this reason, by further including one or more kinds of elements selected from Co, Ni, Fe, Sn, and Bi in the brass plating layer, the one or more kinds of elements selected from a group consisting of elements such as Co or the like described above function as a sacrificial protection, or increases a corrosion resistance of the brass plating layer by making a combined potential of Cu and Zn more noble. As a result, it is possible to further increase the adhesion force between the steel wire and the rubber, further improve the durability of the tire.

(6) A tire may include the steel wire according to any one of (1) to (5).

In the tire according to one aspect of the present disclosure, it is possible to reduce a thickness of a belt layer including the steel wire described above, and reduce a weight of the belt layer. For this reason, it is possible to reduce a weight of the tire according to one aspect of the present disclosure including such a belt layer, and reduce a rolling resistance of the tire.

In addition, because the tire according to one aspect of the present disclosure uses the steel wire described above, the tire has an excellent durability.

Details of Embodiments of the Present Disclosure

Specific examples of a steel wire and a tire according to one embodiment of the present disclosure (hereinafter also referred to as "the present embodiment") will be described below with reference to the drawings. The present invention is not limited to these examples, but is defined by the scope of claims, and is intended to include all modifications within the meaning and scope of the claims and equivalents thereof.

[Steel Wire]

Hereinafter, the steel wire according to the present embodiment will be described, with reference to FIG. 1A and FIG. 1B.

(1) Cross Sectional Shape

FIG. 1A is a cross sectional view of a steel wire 10 according to the present embodiment along a plane perpendicular to a longitudinal direction.

Figure 1B:
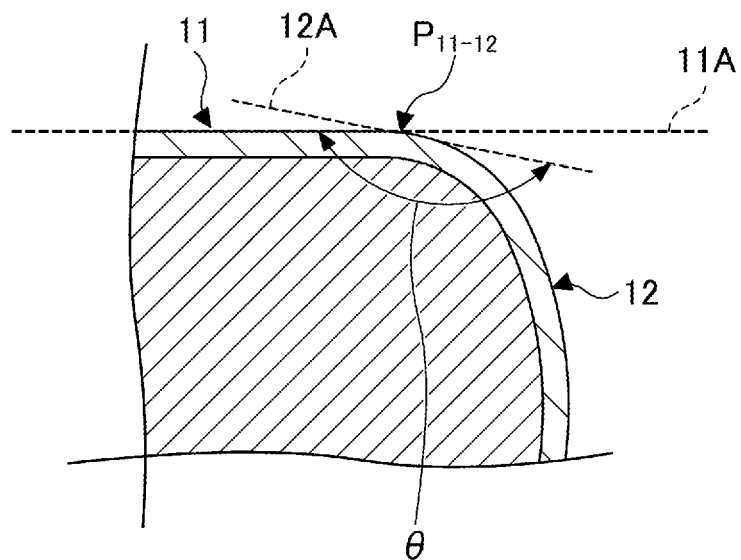
FIG. 1B is an enlarged view of a vicinity of a connecting point between a linear part and a curved part in the cross sectional view of the steel wire according to one aspect of the present disclosure along the plane perpendicular to the longitudinal direction.

FIG. 1B is an enlarged view of a vicinity of a connecting point between a linear part 11 and a curved part 12 in the cross sectional view of the steel wire 10 according to the present embodiment along the plane perpendicular to the longitudinal direction.

The steel wire 10 according to the present embodiment is a single wire, that is, a single-core wire, and may also be referred to as a single-core steel wire. In addition, the steel wire 10 according to the present embodiment is preferably not subjected to a twisting process along the longitudinal direction, and is preferably a straight steel wire.

As illustrated in FIG. 1A, the steel wire 10 according to the present embodiment can have a flat shape in the cross section perpendicular to the longitudinal direction. The term flat shape as used herein refers to a shape that is flat such that a thickness is smaller than a width, for example.

The steel wire can be arranged in a belt layer of the tire, for example. As will be described later in a description of the tire, the belt layer includes the steel wire and rubber, and the steel wire is embedded in the rubber. Because a thickness of the belt layer can be selected so that the steel wire can be embedded in the rubber, it is also possible to reduce the thickness of the belt layer by making the cross sectional shape of the steel wire have the flat shape, and reducing the thickness of the steel wire. Accordingly, by using the steel wire having the flat cross sectional shape, it is possible to reduce an amount of the rubber included in the belt layer, when compared to a case where the steel wire used has the same cross sectional area but a circular cross sectional shape, for example. For this reason, it is possible to reduce a weight of the belt layer, and also reduce a weight of the tire including the belt layer, by using the steel wire having the flat cross sectional shape.

However, according to studies conducted by the present inventors, when the steel wire having the flat cross sectional shape is embedded in the rubber, there are cases where a crack is generated in the rubber from a vicinity of a boundary portion between a linear part and a curved part of the steel wire, to thereby deteriorate an adhesion between the steel wire and the rubber.

Hence, the present inventors conducted further studies on steel wires, capable of reducing the weight and ensuring the durability of the tire, when used in the tire. As a result, it was found that lightweight properties and the durability of the tire using the steel wire can be improved, by making the cross sectional shape of the steel wire have a predetermined flat shape.

As illustrated in FIG. 1A, an outer shape of the cross section of the steel wire 10 according to the present embodiment including a pair of linear parts 11 opposing each other, and a pair of curved parts 12 opposing each other and connecting the linear parts 11.

The linear part 11 can include a first linear portion 111, and a second linear portion 112.

The curved part 12 can include a first curved portion 121 and a second curved portion 122.

The curved part 12 can be arranged so as to connect the pair of linear parts 11.

The first linear portion 111 and the second Linear portion 112 are preferably parallel to each other, as illustrated in FIG. 1A. The term parallel used herein does not refer to a parallel state in a strict sense of the term, but can refer to a state where the two linear portions are arranged side by side.

The first curved portion 121 and the second curved portion 122 are arranged to oppose each other. Each of the first curved portion 121 and the second curved portion 122 can be arranged to connect in between an end of the first linear portion 111 and an end of the second linear portion 112. As illustrated in FIG. 1A, for example, each of the first curved portion 121 and the second curved portion 122 can have a curved shape that is convex toward an outer side of the steel wire 10.

The curved part 12 can include a pair of first regions 131 located at positions near the linear part 11, that is, at both ends of the curved part 12, and a second region 132 located at a position between the pair of first regions 131.

Hence, a radius of curvature, $R_1$ of the first region 131 is preferably greater than or equal to 0.05 mm but less than 0.15 mm, and more preferably greater than or equal to 0.05 mm but less than or equal to 0.1 mm.

Moreover, a radius of curvature, $R_2$ of the second region 132 is preferably greater than or equal to 0.13 mm but less than or equal to 0.2 mm, and more preferably greater than or equal to 0.14 mm but less than or equal to 0.2 mm.

According to studies conducted by the present inventors, in a conventional steel wire having a cross section with a flat shape, an outer shape of the cross section includes a linear part and a curved part, and an inclination greatly changes at a boundary portion between the linear part and the curved part. Hence, when the conventional steel wire having the flat shape is applied to the tire, a crack, originating from a boundary portion between the linear part and the curved part, is generated in the rubber, to thereby deteriorate the durability of the tire.

Hence, the present inventors conducted further studies. According to these studies, it is possible to reduce a change in the inclination at the boundary portion between the linear part 11 and the curved part 12, by forming the first region 131 and the second region 132 in the curved part 12, and setting the radius of curvature of each of these regions within the respective range described above. For this reason, it was found that the generation of a crack in the rubber can be reduced, and the durability of the tire can be improved, in the case where the steel wire according to the present embodiment satisfying such features and ranges described above is applied to the tire.

As described above, the first region 131 can be arranged at the position of the curved part 12 near the linear part 11. For this reason, as illustrated in FIG. 1A, for example, the first curved portion 121 can have the first region 131 on the side of the first linear portion 111, and on the side of the second linear portion 112. As illustrated in FIG. 1A, the first region 131 can be provided so as to connect directly to the first linear portion 111 and the second linear portion 112 of the linear part 11, but the first region is not limited to such a configuration. For example, a transition region where the linear portion of the linear part 11 changes to the radius of curvature of the first region 131, can be provided between the linear part 11 and the first region 131.

The second region 132 can be arranged between the pair of first regions 131. The second region 132 can be arranged at a central portion of the curved part 12 along the longitudinal direction, for example. Because the curved part 12 is arranged along a direction of a thickness T of the steel wire 10, the central portion of the curved part 12 along the longitudinal direction can also be referred to as the central portion along the direction of the thickness T. The first region 131 and the second region 132 can be provided continuously on the curved part 12, as illustrated in FIG. 1A, but the first region 131 and the second region 132 are not limited to such a configuration. For example, a transition region where the radius of curvature of the first region 131 changes to the radius of curvature of the second region 132, can be provided between the first region 131 and the second region 132.

Although the first region 131 and the second region 132 are illustrated only on the side of the first curved portion 121 in FIG. 1A, a first region and a second region may be provided in a similar manner on the side of the second curved portion 122.

By setting the radius of curvature, $R_1$ of the first region 131 greater than or equal to 0.05 mm as described above, it is possible to reduce a change in the inclination at the boundary portion between the linear part 11 and the curved part 12. For this reason, when the steel wire is applied to the tire, it is possible to reduce the generation of the crack in the rubber, and improve the durability of the tire. By setting the radius of curvature, $R_1$ of the first region 131 less than 0.15 mm, it is possible to secure the length of the linear part 11, and improve handling and stability of the tire using the steel wire. The handling and stability refers to a tracking performance of the tire in response to a steering operation when a steering wheel of a vehicle is operated. The higher the handling and stability become, the higher the tracking performance of the tire in response to the steering operation becomes.

By setting the radius of curvature, $R_2$ of the second region 132 greater than or equal to 0.13 mm, it is possible to reduce an amount of processing to be performed when manufacturing the steel wire, and increase a strength of the steel wire. By setting the radius of curvature, $R_2$ of the second region 132 less than or equal to 0.2 mm, it is possible to distribute a force applied along the direction of the thickness T of the steel wire, and improve the durability of the steel wire and the tire including the steel wire.

In the curved part 12, the radius of curvature, $R_1$ of the first region 131 and the radius of curvature, $R_2$ of the second region 132 need simply satisfy the respective ranges described above. For this reason, the radius of curvature, $R_1$ of the first region may be the same as or different from the radius of curvature, $R_2$ of the second region. However, the radius of curvature, $R_1$ and the radius of curvature, $R_2$ are preferably different. When the radius of curvature, $R_1$ and the radius of curvature, $R_2$ are different, that is, when a relationship $R_1 \neq R_2$ is satisfied, it is possible to particularly reduce a change in the inclination at the boundary portion between the linear part and the curved part. For this reason, when the steel wire is applied to the tire, it is possible to particularly reduce the generation of the crack in the rubber, and further improve the durability of the tire.

Further, according to studies conducted by the present inventors, in the curved part 12, the radius of curvature, $R_1$ of the first region 131 located at the position near the linear part 11, and the radius of curvature, $R_2$ of the second region 132, preferably satisfy a relationship $R_2 > R_1$. This is because it is possible to improve the handling and stability of the tire using the steel wire, by setting the relationship to $R_2 > R_1$.

As illustrated in FIG. 1B, an angle θ formed between the linear part 11 and the curved part 12 is preferably greater than or equal to 165 degrees, and more preferably greater than or equal to 170 degrees.

By setting the angle θ formed between the linear part 11 and the curved part 12 to greater than or equal to 165 degrees, in addition to setting the radii of curvatures of the first region 131 and the second region 132 of the curved part 12 to the respective ranges described above, it is possible to particularly reduce a large change in the inclination at the boundary portion between the linear part 11 and the curved part 12. For this reason, it is possible to prevent the crack, originating from the boundary portion between the linear part 11 and the curved part 12, from being generated in the rubber, and improve the durability of the tire.

An upper limit of the angle θ formed between the linear part 11 and the curved part 12 is not particularly limited, and the angle θ is preferably less than or equal to 270 degrees, more preferably less than or equal to 200 degrees, and still more preferably less than or equal to 180 degrees. The steel wire according to the present embodiment can be processed into a predetermined shape, by pressing and rolling a raw steel wire having a circular shape in the cross section perpendicular to the longitudinal direction using a rolling roller in a plurality of rolling steps. As described above, in a case where the raw steel wire is pressed and rolled in the plurality of rolling steps, a minute convex portion may be formed between the linear part 11 and the curved part 12, for example, due to different locations pressed during each of the rolling steps. For this reason, the angle θ is preferably less than or equal to 270 degrees, and more preferably less than or equal to 200 degrees, as described above. However, because such a minute convex portion is preferably not formed, the angle θ is still more preferably less than or equal to 180 degrees.

The angle θ formed between the linear part 11 and the curved part 12 can be obtained in the following manner.

As illustrated in FIG. 1B, a tangential line 11A of the linear part 11, and a tangential line 12A of the curved part 12, are drawn at a connecting point $P_{11\text{-}12}$ of the linear part 11 and the curved part 12. Then, an angle formed between the tangential line 11A and the tangential line 12A is measured, and set as the angle θ formed between the linear part 11 and the curved part 12.

A length $L_{111}$ of the first linear portion 111 and a length $L_{112}$ of the second linear portion 112 of the steel wire according to the present embodiment are not particularly limited, and can be arbitrarily selected according to a size or the like of the steel wire before being processed into the flat shape, for example. $L_{111}$ and $L_{112}$ are preferably greater than or equal to 0.10 mm but less than or equal to 0.36 mm, and more preferably greater than or equal to 0.12 mm but less than or equal to 0.32 mm, for example. The length $L_{111}$ of the first linear portion 111 and the length $L_{112}$ of the second linear portion 112 may be the same or different.

In addition, a maximum distance between the first curved portion 121 and the second curved portion 122 of the steel wire 10 according to the present embodiment, that is, a specific size of a width W of the steel wire 10 according to the present embodiment, is also not particularly limited. The width W of the steel wire 10 according to the present embodiment is preferably greater than or equal to 0.32 mm but less than or equal to 0.52 mm, more preferably greater than or equal to 0.35 mm but less than or equal to 0.52 mm, and still more preferably greater than or equal to 0.42 mm but less than or equal to 0.50 mm, for example.

An aspect ratio of the steel wire 10 according to the present embodiment is not particularly limited, but the aspect ratio is preferably greater than or equal to 60%. The aspect ratio refers to a ratio of the thickness T, that is the maximum distance between the first linear portion 111 and the second linear portion 112, with respect to the width W, that is the maximum distance between the first curved portion 121 and the second curved portion 122, and can be computed from (aspect ratio (%))=T/W×100. The maximum distance between the first linear portion 111 and the second linear portion 112 refers to the distance at a longest portion between the first linear portion 111 and the second linear portion 112.

According to studies conducted by the present inventors, it is possible to particularly improve the durability and impact resistance of the steel wire, by setting the aspect ratio greater than or equal to 60%. It may be regarded that such improvements can be made, because the generation of the crack in a boundary portion between a portion subjected to a compression process and a portion subjected to a drawing process can be reduced when processing the cross sectional shape of the steel wire to the flat shape, by setting the aspect ratio greater than or equal to 60%. The aspect ratio is more preferably greater than or equal to 62%.

Moreover, an upper limit of the aspect ratio is not particularly limited, but is preferably less than or equal to 80%, and more preferably less than or equal to 75%.

This is because, by setting the aspect ratio less than or equal to 80%, the thickness of the steel wire can be particularly reduced, and is preferable from a viewpoint of particularly reducing the thickness of the belt layer when the steel wire is used in the tire. In addition, by setting the aspect ratio less than or equal to 80°, it is possible to particularly reduce a spiral (helical) twisting of the wire that requires wire straightening, caused by a residual stress due to a processing difference between a thickness direction and a width direction of the steel wire, and by a difference between surface hardnesses, and enable an excellent handleability of the steel wire. For this reason, it is possible to improve a productivity when the steel wire is used in the tire or the like.

The thickness T of the steel wire 10 according to the present embodiment is not particularly limited, but is preferably greater than or equal to 0.200 mm, more preferably greater than or equal to 0.301 mm, and still more preferably greater than or equal to 0.305 mm.

This is because, by setting the thickness T of the steel wire greater than or equal to 0.200 mm, the durability and impact resistance of the steel wire can be particularly improved.

An upper limit of the thickness T of the steel wire is not particularly limited, but is preferably less than or equal to 0.50 mm, and more preferably less than or equal to 0.42 mm, for example. This is because, by setting the thicknesses T of the steel wire less than or equal to 0.50 mm, it is possible to reduce the thickness of the belt layer in which the steel wire is arranged, and further reduce the amount of the rubber included in the belt layer, when the steel wire is used in the tire. Further, the weight of the belt layer using the steel wire, and the weight of the tire including the belt layer, can be reduced.

(2) Hardness Distribution of Steel Wire

As illustrated in FIG. 1A, in the cross section perpendicular to the longitudinal direction, two intersection points of a center line 14 equidistant from the pair of opposing linear parts 11, and the pair of opposing curved parts 12, are defined as a first end portion 1411 and a second end portion 1412. Further, two points on the center line 14, that are separated by 0.1 mm from the first end portion 1411 and the second end portion 1412, respectively, are defined as surface-side measurement points 142.

A point on the center line 14, that is equidistant from the first end portion 1411 and the second end portion 1412, is defined as a center measurement point 143.

The center line 14 is a straight line connecting points equidistant from the linear parts 11. For this reason, in a case where the first linear portion 111 and the second linear portion 112 are parallel to each other, for example, the distance between the first linear portion 111 and the center line 14 is one-half the thickness T of the steel wire 10, that is, T/2. The same applies to the distance between the second linear portion 112 and the center line 14.

The curved part 12 includes the first curved portion 121, and the second curved portion 122, as described above. For this reason, the surface-side measurement points 142 are two measurement points, namely, a first surface-side measurement point 1421 located at a position near the first curved portion 121, and a second surface-side measurement point 1422 located at a position near the second curved portion 122. The intersection point of the center line 14 and the first curved portion 121 is defined as the first end portion 1411, and the intersection point of the center line 14 and the second curved portion 122 is defined as the second end portion 1412, as described above. In this case, a distance $L_{1421}$ between the first end portion 1411 and the first surface-side measurement point 1421, and a distance $L_{1422}$ between the second end portion 1412 and the second surface-side measurement point 1422, are 0.1 mm, respectively.

The center measurement point 143 is equidistant from the first end portion 1411 and the second end portion 1412 on the center line 14, as described above. In a case where a distance between the first end portion 1411 and the second end portion 1412 coincides with the width W of the steel wire 10, a distance $L_{143}$ between the first end portion 1411 and the center measurement point 143 is W/2. The same applies to a distance between the second end portion 1412 and the center measurement point 143.

A difference between an average value HV1 of Vickers hardnesses at the two surface-side measurement points 142, and a Vickers hardness HV2 at the center measurement point 143, denoted by HV1−HV2, is preferably greater than or equal to −60HV0.1 but less than or equal to −10HV0.1, and more preferably greater than or equal to −60HV0.1 but less than or equal to −20HV0.1.

When the HV1-HV2 described above is less than or equal to −10HV0.1, the hardness of the central portion including the center measurement point 143 of the steel wire is higher than the hardness of the surface side including the surface-side measurement point. By making the hardness of the central portion of the steel wire higher than the hardness of the surface side in this manner, the impact received by the linear part 11 described above can be uniformly received by the entire surface including the linear part 11. In the case of a flattened steel wire, the impact resistance may decrease, but the impact resistance can be increased by using the steel wire having the hardness distribution described above.

However, the hardness of the central portion needs to be particularly increased, in order to make HV1−HV2 less than −60HV0.1. For this reason, an excessively large pressure needs to be applied when manufacturing the steel wire by flattening, and a material used for the steel wire may become brittle or the like. Hence, HV1−HV2 is preferably greater than or equal to −60HV0.1, as described above.

The Vickers hardness at each of the measurement points described above can be measured in accordance with JIS Z 2244 (2009), by setting a test force to 0.1 kgf, that is, 0.9807 N, and setting a holding time of the test force to 5 seconds. A unit HV0.1 of the Vickers hardness is the unit prescribed under JIS Z 2244 (2009), and 0.1 of HV0.1 refers the test force of 0.1 kgf.

(3) Material of Steel Wire

A material of the steel wire according to the present embodiment is not particularly limited. The steel wire according the present embodiment can include a steel wire 101, and a plating layer 102 deposited on a surface of the steel wire, for example.

A high carbon steel wire can be suitably used for the steel wire 101.

The plating layer 102 may be a plating layer consisting solely of Cu (copper) and Zn (zinc), for example, as metal components, that is, a brass plating layer, but may further include metal components other than Cu and Zn. The plating layer may further include one or more kinds of elements selected from Co (cobalt), Ni (nickel), Fe (iron), Sn (tin), and Bi (bismuth), for example, as the metal components.

That is, the steel wire according to the present embodiment can have, on the surface thereof, the brass plating layer including Cu and Zn, for example. In addition, the brass plating layer may further include one or more kinds of elements selected from Co, Ni, Fe, Sn, and Bi. The brass plating layer can be deposited on the surface of the steel wire, for example, as described above.

Because the steel wire according to the present embodiment has the brass plating layer including Cu and Zn, in a case where the steel wire is covered with rubber and vulcanized to form the tire, an adhesive layer including $Cu_2S$ can be formed on the rubber side of an interface between the steel wire and the rubber. Zn has a function of accelerating the formation of $Cu_2S$. By forming the adhesive layer, it is possible to increase an adhesion force between the steel wire and the rubber, and enable the tire to have a particularly excellent durability.

In addition, Co, Ni, Fe, Sn, and Bi have higher ionization tendencies than Zn. For this reason, by further including one or more kinds of elements selected from Co, Ni, Fe, Sn, and Bi in the brass plating layer, the one or more kinds of elements selected from a group consisting of elements such as Co or the like described above function as a sacrificial protection, or increases a corrosion resistance of the brass plating layer by making a combined potential of Cu and Zn more noble. As a result, it is possible to further increase the adhesion force between the steel wire and the rubber, further improve the durability of the tire.

(4) Method for Manufacturing Steel Wire

A method for manufacturing the steel wire according to the present embodiment is not particularly limited, and the steel wire can be manufactured so that the cross sectional shape thereof becomes the shape described above.

The method for manufacturing the steel wire according to the present embodiment can include the following steps, for example.

A raw steel wire preparation step of preparing a raw steel wire having a circular shape in a cross section perpendicular to a longitudinal direction thereof.

A first axial rolling step of supplying the raw steel wire to a pair of a first rolling rollers having pressing surfaces opposing each other and a pair of second rolling rollers having pressing surfaces opposing each other, and pressing the raw steel wire along a first axial direction parallel to a diameter in the cross section perpendicular to the longitudinal direction of the raw steel wire.

A second axial rolling step of supplying the raw steel wire after the first axial rolling step between a pair of third rolling rollers having pressing surfaces opposing each other, and pressing the raw steel wire along a second axial direction perpendicular to the first axial direction in the cross section perpendicular to the longitudinal direction of the raw steel wire.

A flat roller having a flat pressing surface can be used for the first rolling roller described above. In addition, a concave roller having a groove at a portion that presses the raw steel wire 21 in a cross section along a plane passing through a center axis of the second rolling roller, can be used for the second rolling roller.

Figure 2:
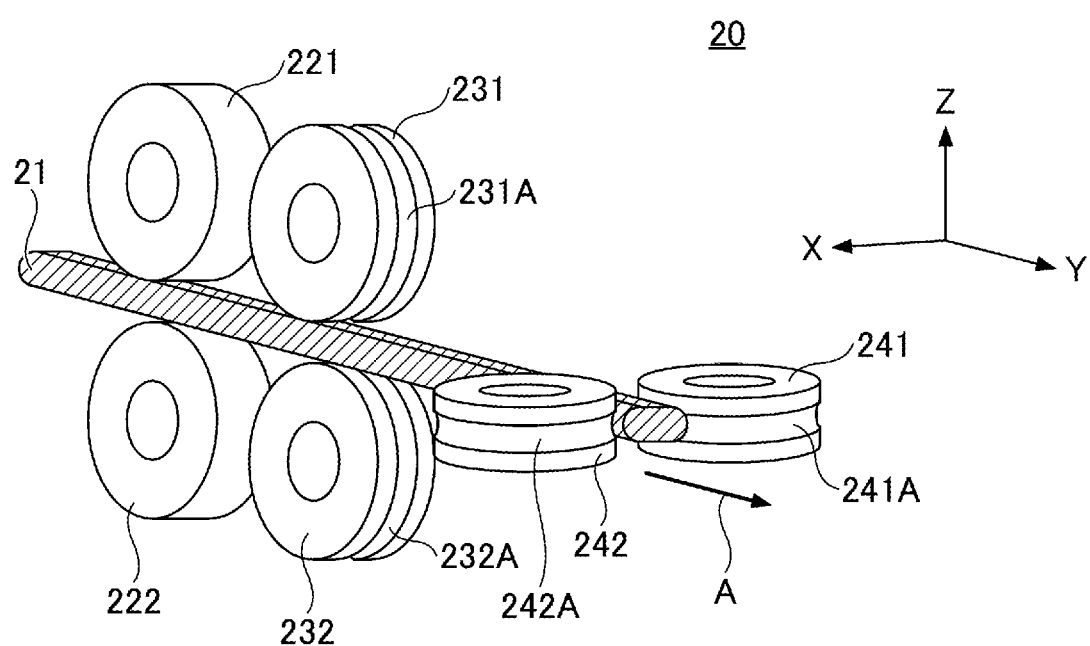
FIG. 2 is a diagram for explaining an example of a configuration of a rolling mill that can be used when manufacturing the steel wire according to one aspect of the present disclosure.

The first axial rolling step and the second axial rolling step can be performed by a rolling mill 20 illustrated in FIG. 2, for example.

The rolling mill 20 includes a pair of first rolling rollers 221 and 222 having pressing surfaces opposing each other, and a pair of second rolling rollers 231 and 232 having pressing surfaces opposing each other.

The first rolling rollers 221 and 222, and the second rolling rollers 231 and 232, can press the raw steel wire 21 in the first axial direction parallel to the diameter of the cross section of the raw steel wire 21, that is, in the thickness direction, for example. In the case of the rolling mill 20 illustrated in FIG. 2, the first axis direction corresponds to a Z-axis direction. For this reason, the pair of first rolling rollers 221 and 222, and the pair of second rolling rollers 231 and 232, can press the raw steel wire 21 along the Z-axis direction in FIG. 2, in directions from above and below the raw steel wire 21, to perform the first axial rolling step described above.

The first rolling rollers 221 and 222 are flat rollers having flat pressing surfaces opposing the raw steel wire 21. That is, in cross sections passing through center axes of the first rolling rollers 221 and 222, for example, portions of the first rolling rollers 221 and 222, that press the raw steel wire 21, have a linear shape.

The second rolling rollers 231 and 232 are concave rollers, and in cross sections passing through center axes of the second rolling rollers 231 and 232, the second rolling rollers 231 and 232 can include grooves 231A and 232A, that are concave portions, respectively, at portions that press the raw steel wire 21. The grooves 231A and 232A can have a shape corresponding to the first curved portion 121 and the second curved portion 122, particularly the first region 131.

In the first axial rolling step, the raw steel wire 21 is first pressed and rolled by the first rolling rollers 221 and 222, to thereby form the first linear portion 111 and the second linear portion 112 in the cross section of the steel wire 10 illustrated in FIG. 1A. In addition, because the first rolling rollers 221 and 222 are flat rollers and the pressing surfaces are flat surfaces, it is possible to increase a hardness of the central portion of the steel wire, and make the hardness uniform in a periphery of the central portion.

However, in a case where rolling is performed solely by the first rolling rollers 221 and 222, it may be difficult to form the first region 131 described above. For this reason, it is preferable to press and roll the raw steel wire 21 by the second pressing rollers 231 and 232, that are concave rollers having the predetermined grooves 231A and 232A in the pressing surfaces thereof, after the pressing and rolling by the first pressing rollers 221 and 222. The first region 131 described above can be formed by the pressing and rolling using the pair of second rolling rollers 231 and 232.

If the pressing and rolling are performed solely by the second rolling rollers 231 and 232, that are concave rollers, without performing the pressing and rolling by the first rolling rollers 221 and 222, it is difficult to form the first linear portion 111 and the second linear portion 112. In addition, the hardness of the central portion of the steel wire 10 cannot be increased sufficiently in some cases.

The rolling mill 20 can include a pair of third rolling rollers 241 and 242 on a downstream side of the first rolling rollers 221 and 222 and the second rolling rollers 231 and 232, in a transport direction of the raw steel wire 21. The third rolling rollers 241 and 242 can press the raw steel wire 21 after the first axial rolling step in a second axial direction perpendicular to the first axial direction in the cross section of the raw steel wire 21, that is, in the width direction, for example. In the case of the rolling mill 20 illustrated in FIG. 2, the second axis direction corresponds to an X-axis direction, and the third rolling rollers 241 and 242 can press the raw steel wire 21 after the first axial rolling step along the X-axis direction in FIG. 2, in directions from the left and right of the raw steel wire 21, to perform the second axis direction rolling step described above. The term perpendicular used herein does not refer to a perpendicular state in a strict sense of the term, but can refer to a state where the two directions are substantially perpendicular and a certain amount of error is included.

In the second axial rolling step, the raw steel wire 21 after the first axial rolling step is pressed and rolled by the pair of third rolling rollers 241 and 242, to thereby form the first curved portion 121 and the second curved portion 122 in the cross section of the steel wire 10 illustrated in FIG. 1A. For this reason, the pressing surfaces of the pair of third rolling rollers 241 and 242, that is, the surfaces making contact with the raw steel wire 21, preferably have shapes corresponding to the first curved portion 121 and the second curved portion 122. For example, the third rollers 241 and 242 can include grooves 241A and 242A having shapes corresponding to the first curved portion 121 and the second curved portion 122, in cross sections passing through center axes of the third rollers 241 and 242, respectively. In addition, by performing the first axial rolling step and the second axial rolling step described above, the angle θ formed between the linear part 11 and the curved part 12 can be adjusted to fall within a desired range.

In a case where the predetermined cross sectional shape is obtained by the first axial rolling step, the second axial rolling step may be omitted.

In the first axial rolling step and the second axial rolling step, extent of pressing, rolling, or the like can be adjusted so as to satisfy the cross sectional shape of the steel wire according to the present embodiment described above.

The steel wire according to the present embodiment can be manufactured by transporting the raw steel wire 21 along an arrow A illustrated in FIG. 2, that is, along a Y-axis direction, and performing the first axial rolling step and the second axial rolling step described above with respect to the raw steel wire 21 in its entirety along the longitudinal direction thereof.

An example of the configuration for the method for manufacturing the steel wire according to the present embodiment is described by referring to an example that performs the first axial rolling step and the second axial rolling step, however, the present invention is not limited to such an embodiment. For example, a steel wire having a desired shape can be obtained by passing a raw steel wire through a die having a shape corresponding to a required shape of the steel wire.

[Tire]

Next, a tire according to the present embodiment will be described, with reference to FIG. 3 and FIG. 4.

The tire according to the present embodiment can include the steel wire described above.

Figure 3:
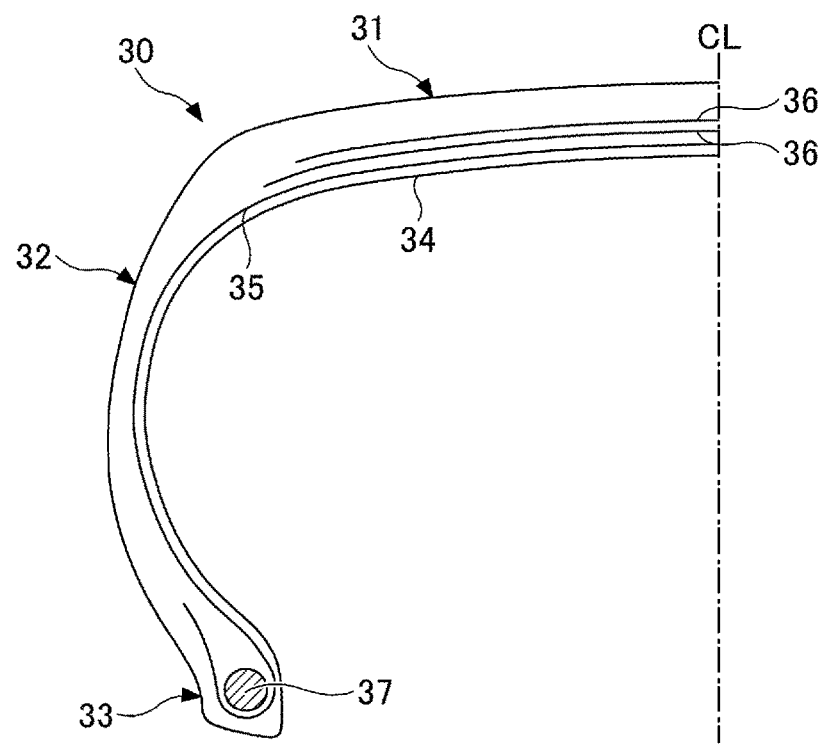
FIG. 3 is a cross sectional view of a tire according to one aspect of the present disclosure.

FIG. 3 illustrates a cross sectional view of a tire 30 according to the present embodiment along a plane perpendicular to a circumferential direction of the tire 30. Although FIG. 3 illustrates only a portion on a left side of CL (center line), a similar structure is continuously provided on a right side of the CL, using the CL as an axis of symmetry.

As illustrated in FIG. 3, the tire 30 includes a tread part 31, a sidewall part 32, and a bead part 33.

The tread part 31 is a part that makes contact with a road surface. The bead part 33 is provided on an inner diameter side of the tire 30 than the tread part 31. The bead part 33 is a part that makes contact with a rim of a wheel of a vehicle. The sidewall part 32 connects the tread part 31 and the bead part 33. When the tread part 31 receives an impact from the road surface, the sidewall part 32 is elastically deformed to absorb the impact.

The tire 30 includes an inner liner 34, a carcass 35, a belt layer 36, and a bead wire 37.

The inner liner 34 is composed of rubber, and seals a space between the tire 30 and the wheel.

The carcass 35 forms a skeleton structure of the tire 30. The carcass 35 is composed of an organic fiber, such as polyester, nylon, rayon, or the like, or a steel wire, and rubber. The steel wire described above can also be used for the carcass 35.

The bead wire 37 is provided in the bead part 33. The bead wire 37 receives a tensile force acting on the carcass 35.

The belt layer 36 tightens the carcass 35, to increase a rigidity of the tread part 31. In the example illustrated in FIG. 3, the tire 30 has two belt layers 36.

Figure 4:
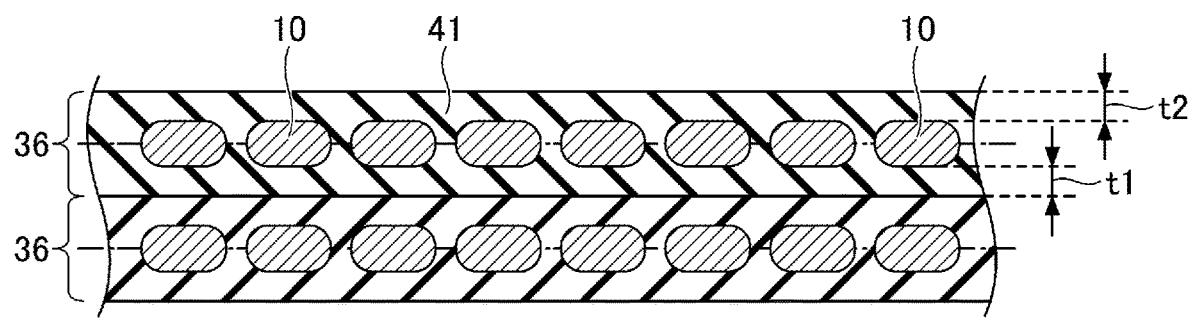
FIG. 4 is a diagram schematically illustrating a belt layer.

FIG. 4 is a diagram schematically illustrating the two belt layers 36. FIG. 4 illustrates a cross sectional view along a plane perpendicular to a Longitudinal direction of the belt layers 36, that is, a circumferential direction of the tire 30.

As illustrated in FIG. 4, the two belt layers 36 are laminated in a radial direction of the tire 30. Each belt layer 36 includes a plurality of steel wires 10, and a rubber 41. The plurality of steel wires 10 is arranged side by side in a line. The steel wire described above can be used for the steel wires 10.

The steel wire described above preferably has a flat shape in the cross section perpendicular to the longitudinal direction thereof, and the steel wire is preferably arranged so that the thickness direction of the steel wire coincides with the thickness direction of the belt layer. For this reason, the steel wire 10 is preferably arranged so that the first linear portion 111 and the second linear portion 112 of the steel wire 10 described above extend along the width direction of the belt layer.

Further, the rubber 41 covers the steel wires 10, and an entire circumference of each of the individual steel wires 10 is covered with the rubber 41. The steel wires 10 are embedded in the rubber 41.

The steel wire described above has the flat shape in the cross section perpendicular to the longitudinal direction thereof. For this reason, it is possible to reduce exposure of the steel wire 10, even if a first rubber thickness t1, that is a thicknesses of the rubber 41 arranged below the steel wire 10 in the belt layer 36, and a second rubber thickness t2, that is a thicknesses of the rubber 41 arranged above the steel wires 10, are reduced. Accordingly, a thickness of the entire belt layer 36 can be reduced.

Hence, in the tire according to the present embodiment, it is possible to reduce the thickness of the entire belt layer 36 including the steel wires 10 described above, and reduce a weight of the belt layer 36. For this reason, it is also possible to reduce a weight of the tire according to the present embodiment including such a belt layer, and reduce a rolling resistance of the tire.

Moreover, because the tire according to the present embodiment uses the steel wire described above, the tire has an excellent durability.

Although the embodiments are described above in detail, the present invention is not limited to specific embodiments, and various variations and modifications can be made within the scope of the present invention described in the claims.

Exemplary Implementations

Hereinafter, the present invention will be described with reference to specific exemplary implementations, but the present invention is not limited to the specific exemplary implementations.
(Evaluation Method)

First, a method for evaluating the steel wire manufactured in the following experimental examples will be described.
(1) Evaluation of Cross Sectional Shape of Steel Wire The obtained steel wire was embedded in a transparent resin, and a sample was cut out so that a surface (cross section) perpendicular to the longitudinal direction of the steel wire was exposed.

Then, a length and a distance of each part in the cross section were measured using a projector.

More particularly, the length $L_{111}$ of the first linear portion 111, the length $L_{112}$ of the second linear portion 112, and the thickness T that is the maximum distance between the first linear portion 111 and the second linear portion 112, were measured.

In addition, the maximum distance between the first curved portion 121 and the second curved portion 122, that is, the width W of the steel wire 10, was measured.

Further, the radius of curvature, $R_1$ of the first region 131, and the radius of curvature, $R_2$ of the second region 132, of the first curved portion 121 and the second curved portion 122, were measured.

Moreover, as illustrated in FIG. 1B, the angle θ formed between the linear part 11 and the curved part 12 was measured. When making the measurement, the tangential line 11A of the linear part 11, and the tangential line 12A of the curved part 12, were first drawn at the connecting point $P_{11-12}$ of the linear part 11 and the curved part 12. Then, the angle θ was obtained by measuring an angle formed between the tangential line 11A and the tangential line 12A.

When multiple measurements were made at the same position, it was confirmed that the angle θ is distributed within a range of a median value±2.5 degrees, and a measurement accuracy is within 5 degrees. Table 1 and Table 2 illustrate the median values for cases where the angle θ is measured 5 times at the same position.

In each of the following experimental examples, the first curved portion 121 and the second curved portion 122 had the same shape. Further, in each of the steel wires manufactured in the following experimental examples, the median values of the angles θ at a total of 4 positions between the linear part 11 and the curved part 12, were the same. In addition, in each of the steel wires manufactured in the following experimental example 1-1 to experimental example 1-4, experimental example 2-1, experimental example 2-2, and experimental example 3-2 to experimental example 3-4, the radii of curvatures, $R_1$ of the first regions 131 at a total of 4 locations included in the first curved portion 121 and the second curved portion 122, were the same value.

The aspect ratio was computed from the thickness T and the width W, according to the following formula.

(Aspect Ratio (%))=$T/W$×100

(2) Evaluation of Hardness Distribution

In one cross section perpendicular to the longitudinal direction of the steel wire manufactured in each of the following experimental examples, the Vickers hardness was measured at the surface-side measurement points 142 described above, and the center measurement point 143, on the center line 14 equidistant from the pair of opposing linear parts 11. The Vickers hardness was measured in accordance with JIS Z 2244 (2009). When making the measurement, the test force was set to 0.1 kgf, that is, 0.9807 N, and the holding time of the test force was set to 5 seconds. Because the surface-side measurement points 142 and the center measurement point 143 are already described above, a description thereof will be omitted.

HV1-HV2, that is the difference between the average value HV1 of the Vickers hardnesses at the two surface-side measurement points 142, and the Vickers hardness HV2 at the center measurement point 143, was computed. In Table 1, the evaluation results are illustrated as HV1-HV2.
(3) Durability Test The steel wire manufactured in each of the following experimental examples was arranged on a rubber sheet, and further covered with the rubber sheet. Thus, a laminate of the rubber sheet and the steel wire having a rectangular parallelepiped shape, having a total thickness that is five times the thickness of the steel wire, was prepared. Further, the laminate of the rubber sheet and the steel wire was vulcanized at 160°° C. for 20 minutes.

A sheet of rubber in which carbon, and various kinds of accelerators, antidegradants, or the like, are blended in a main component of rubber, was used for the rubber sheet.

After natural cooling, a string-like test piece having a cross sectional shape including the steel wire, with a thickness of 5 mm and a width of 10 mm, was obtained by cutting the steel wire/rubber composite using a cutter knife.

Figure 5:
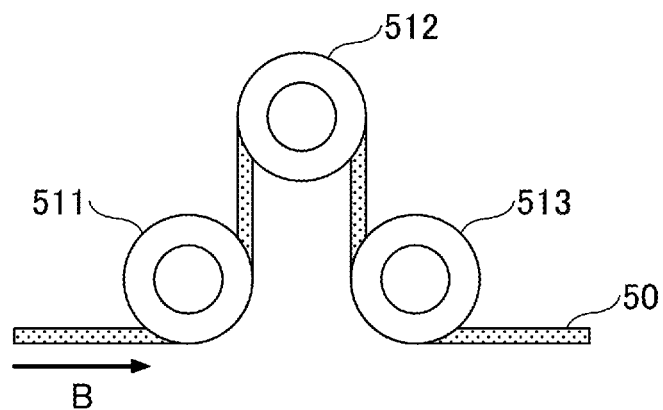
FIG. 5 is a diagram for explaining a durability test of experimental examples.

As illustrated in FIG. 5, a test piece 50 that is obtained was supplied to a first roller 511, a second roller 512, and a third roller 513 having a roller diameter of 25 mm. In this state, the position of each roller was adjusted, so that the test piece 50 positioned between the first roller 511 and the second roller 512, and the test piece 50 positioned between the second roller 512 and the third roller 513, are parallel as illustrated in FIG. 5. In addition, a load of 29.4 N is applied to the test piece 50 placed around the first roller 511 through the third roller 513, along the Longitudinal direction thereof. Then, the first roller 511 through the third roller 513 were rotated, and the test piece 50 was moved in the direction of an arrow B in FIG. 5. Next, the first roller 511 through the third roller 513 were rotated in a reverse direction, and the test piece 50 was moved in a direction opposite to the direction of the arrow B. A reciprocating operation of the test piece 50 described above was regarded as 1 set, and the operation was repeatedly performed. A rotation speed of each roller was set, so that 100 sets per 1 minute of the reciprocating movement described above can be performed. Then, a number of sets of the reciprocating movement of the test piece was counted until the test piece breaks.

The larger the number of sets of the reciprocating movement described above is, the higher the durability becomes.

The evaluation result of the steel wire according to each of the experimental examples was expressed as a durability index, by regarding 100 as being the evaluation result of the steel wire according to the following experimental example 1-5, experimental example 2-3, or experimental example 3-1. The results of the experimental example 1-1 to the experimental example 1-7 were expressed, by regarding 100 as being the evaluation result of the experimental example 1-5. In addition, the results of the experimental example 2-1 to the experimental example 2-3 were expressed, by regarding 100 as being the evaluation result of the experimental example 2-3. Further, the results of the experimental example 3-1 to the experimental example 3-5, and the experimental example 4-1 were expressed, by regarding 100 as being the evaluation result of the experimental example 3-1.

The larger the durability index is, the higher the durability of the belt layer that can be formed becomes, that is, the higher the durability of the tire that can be formed becomes.

(4) Weight Index

In the evaluation of a weight index, a rubber sheet was manufactured using the steel wire manufactured in each of the following experimental examples.

A rubber composition is based on natural rubber as a rubber component, and includes carbon black, sulfur, zinc oxide, organic acid cobalt, and cobalt stearate as additives.

A rubber sheet having the same configuration as the belt layer 36 illustrated in FIG. 4 was manufactured, using the steel wire and the rubber composition manufactured in each of the experimental examples.

A weight of the rubber sheet manufactured using the steel wire of each of the experimental examples was expressed as an index, by regarding 100 as being the weight of the rubber sheet manufactured using the steel wire of the following experimental example 1-5, the experimental example 2-3, or the experimental example 3-1. The results of the experimental example 1-1 to the experimental example 1-7 were expressed, by regarding 100 as being the weight of the rubber sheet manufactured in the experimental example 1-5. In addition, the results of the experimental example 2-1 to the experimental example 2-3 were expressed, by regarding 100 as being the weight of the rubber sheet manufactured in the experimental example 2-3. The results of the experimental example 3-1 to the experimental example 3-5 and the experimental example 4-1 were expressed, by regarding 100 as being the weight of the rubber sheet manufactured in the experimental example 3-1.

The smaller the weight index is, the lighter the belt layer that can be formed becomes, that is, the lighter the tire that can be formed becomes.

(5) Impact Resistance Index

Figure 6:
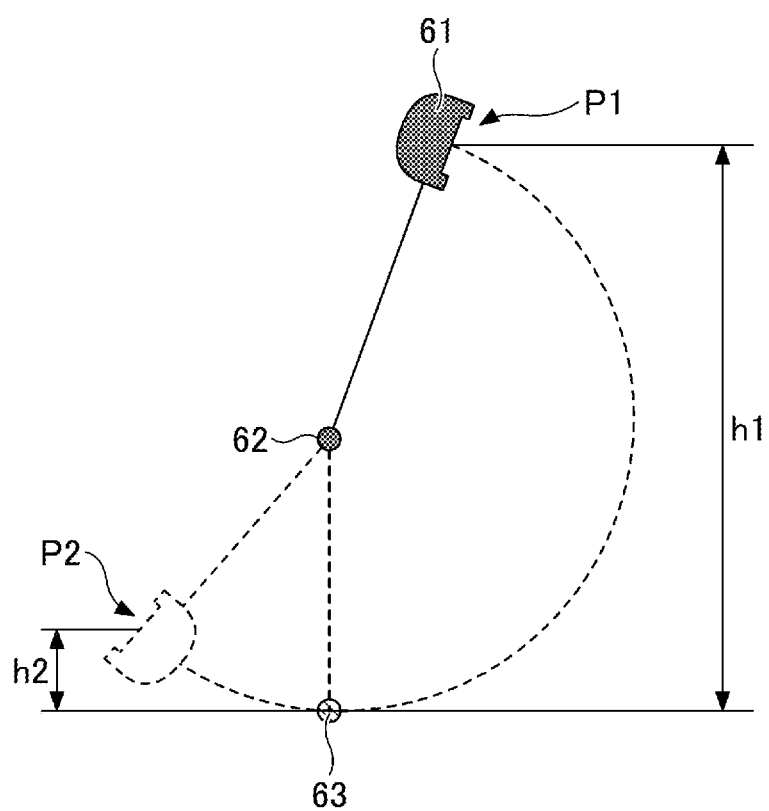
FIG. 6 is a diagram for explaining a Charpy impact testing apparatus used for the experimental examples.

A Charpy impact value was measured by a Charpy impact test, using a Charpy impact testing apparatus illustrated in FIG. 6, and an impact absorption index was computed from the measured Charpy impact value.

For example, as illustrated in FIG. 6, the Charpy impact test can be performed, by rotating a hammer 61 having a mass m from an initial position P1 around a rotation axis 62, and swinging the hammer 61 down to a sample 63 that is set in advance on a moving path of the hammer 61. After breaking the sample 63, the hammer 61 further advances in a rotation direction, and reaches a maximum height position P2.

h1 denotes a height of the initial position P1, with reference to the position of the sample 63, and h2 denotes a height of the maximum height position P2, with reference to the position of the sample 63. In this case, mg(h1−h2), that is a difference between a potential energy at the initial position P1, and a potential energy at the maximum height position P2, becomes an absorbed energy at a time when the sample breaks. The absorbed energy is the Charpy impact value, and the larger a numerical value of the Charpy impact value, the higher the impact resistance of the steel wire becomes.

The evaluation result of the steel wire of each of the experimental examples was expressed by an impact resistance index, by regarding 100 as being the evaluation result of the steel wire according to the following experimental example 1-5, the experimental example 2-3, or the experimental example 3-1. The results of the experimental example 1-1 to the experimental example 1-7 were expressed, by regarding 100 as being the evaluation result of the experimental example 1-5. In addition, the results of the experimental example 2-1 to the experimental example 2-3 were expressed, by regarding 100 as being the evaluation result of the experimental example 2-3. The results of the experimental example 3-1 to the experimental example 3-5 and the experimental example 4-1 were expressed, by regarding 100 as the evaluation result of the experimental example 3-1.

The larger the impact resistance index is, the higher the impact resistance of the steel wire becomes.

EXPERIMENTAL EXAMPLES

Hereinafter, experimental conditions will be described. The experimental example 1-1 to the experimental example 1-3, the experimental example 2-1, the experimental example 3-1 to the experimental example 3-3 are exemplary implementations, and the experimental example 1-4 to the experimental example 1-7, the experimental example 2-2, the experimental example 2-3, the experimental example 3-4, the experimental example 3-5, and the experimental example 4-1 are comparative examples.

Experimental Example 1-1

A raw steel wire 21 having a wire diameter of 0.4 mm and a circular cross sectional shape, was prepared (raw steel wire preparing step). The raw steel wire 21 has a configuration in which a brass plating layer, including Cu and Zn as metal components, is deposited on a surface of a high carbon steel wire.

Then, the raw steel wire was supplied to the rolling mill 20 illustrated in FIG. 2, and processed so that the cross sectional shape becomes predetermined cross sectional shape illustrated in FIG. 1A.

As described above, the rolling mill 20 includes the pair of first rolling rollers 221 and 222 having the opposing pressing surfaces, and the pair of second rolling rollers 231 and 232 having the opposing pressing surfaces. The first rolling rollers 221 and 222 are flat rollers having flat pressing surfaces opposing the raw steel wire 21. The second rolling rollers 231 and 232 are concave rollers including the grooves 231A and 232A, that are concave portions, respectively, at the portions that press the raw steel wire 21, in the cross sections passing through the center axes of the second rolling rollers 231 and 232. The grooves 231A and 232A have a shape corresponding to the first curved portion 121 and the second curved portion 122 to be formed, particularly the first region 131.

The raw steel wire 21 was supplied to the rolling mill 20. Then, the raw steel wire 21 was pressed along the Z-axis direction in FIG. 2, by the pair of first rolling rollers 221 and 222, and the pair of second rolling rollers 231 and 232 (first axis direction rolling step). That is, the raw steel wire 21 was pressed from above and below, along the thickness direction thereof.

As illustrated in FIG. 2, the pair of third rolling rollers 241 and 242 is arranged on the downstream side of the first rolling rollers 221 and 222 and the second rolling rollers 231 and 232 in the transport direction of the raw steel wire 21. The raw steel wire 21 after the first axial rolling step was supplied between the pair of third rolling rollers 241 and 242.

Then, the raw steel wire 21 after the first axial rolling step was pressed by the third rolling rollers 241 and 242, along the X-axis direction in FIG. 2, that is, along the width direction of the raw steel wire 21 from the left and right directions thereof (second axial rolling step). The third rolling rollers 241 and 242 used had the pressing surfaces including the grooves 241A and 242A, having the shapes corresponding to the first curved portion 121 and the second curved portion 122, in the cross sections passing through the center axes of the third rollers 241 and 242, respectively.

Further, the steel wire according to the this experimental example was manufactured by transporting the raw steel wire 21 along the arrow A illustrated in FIG. 2, and performing the first axial rolling step and the second axial rolling step described above with respect to the raw steel wire 21 in its entirety along the longitudinal direction thereof.

In the first axial rolling step and the second axial rolling step, the extent of the pressing and the extent of the rolling were adjusted, so that the cross sectional shape of the steel wire that is obtained becomes the desired shape.

More particularly, the extent of the pressing and the extent of the rolling were adjusted, so that the thicknesses T becomes 0.308 mm and the width W becomes 0.49 mm, the radius of curvature, $R_1$ of the first region 131 of the curved part 12 becomes 0.05 mm, and the radius of curvature, $R_2$ of the second region 132 of the curved part 12 becomes 0.2 mm, and the angle θ becomes 177.5 degrees.

In addition, based on a result of a preliminary test, in the first axial rolling step, the extent of the pressing by the first rolling rollers 221 and 222 and the second rolling rollers 231 and 232 was adjusted, to adjust the hardness of the central portion of the steel wire that is obtained.

The evaluation described above was performed with respect to the steel wire that is obtained. The evaluation results are illustrated in Table 1.

Experimental Example 1-2 To Experimental Example 1-4

In the first axial rolling step and the second axial rolling step, the extent of the pressing and the extent of the rolling were adjusted, so that the thickness T, the width W, the radius of curvature, $R_1$ of the first region 131 of the curved part 12, the radius of curvature, $R_2$ of the second region 132 of the curved part 12, and the angle θ become the values illustrated in Table 1. Moreover, in the first axial rolling step, the extent of the pressing by the first rolling rollers 221 and 222 and the second rolling rollers 231 and 232 was adjusted, to adjust the hardness of the central portion of the steel wires that are obtained.

The steel wires were manufactured and evaluated in the same manner as in the experimental example 1-1, except for the above noted points.

The evaluation results are illustrated in Table 1.

Experimental Example 1-5 To Experimental Example 1-7

In the first axial rolling step and the second axial rolling step, the extent of the pressing and the extent of the rolling were adjusted, so that the thickness T, the width W, the radius of curvature, $R_2$ of the second region 132 of the curved part 12, and the angle θ become the values illustrated in Table 1. Further, in the first axial rolling step, the extent of the pressing by the first rolling rollers 221 and 222 and the second rolling rollers 231 and 232 was adjusted, to adjust the hardness of the central portion of the steel wires that are obtained. The curved part 12 was set to a curve having a constant radius of curvature, $R_2$ having the value illustrated in Table 1. That is, the radius of curvature, $R_1$ and the radius of curvature, $R_2$ satisfy a relationship $R_1=R_2$. The steel wires were manufactured and evaluated in the same manner as in the experimental example 1-1, except for the above noted points.

The evaluation results are illustrated in Table 1.

Experimental Example 2-1

The raw steel wire 21 having a wire diameter of 0.3 mm and a circular cross sectional shape was used. In addition, in the first axial rolling step and the second axial rolling step, the extent of the pressing and the extent of the rolling were adjusted, so that the thickness T, the width W, the radius of curvature, $R_1$ of the first region 131 of the curved part 12, the radius of curvature, $R_2$ of the second region 132 of the curved part 12, and the angle θ become the values illustrated in Table 2. Further, in the first axial rolling step, the extent of the pressing by the first rolling rollers 221 and 222 and the second rolling rollers 231 and 232 was adjusted, to adjust the hardness of the central portion of the steel wire that is obtained.

The steel wire was manufactured and evaluated in the same manner as in the experimental example 1-1, except for the above noted points.

The evaluation results are illustrated in Table 2.

Experimental Example 2-2

In the first axial rolling step and the second axial rolling step, the extent of the pressing and the extent of the rolling were adjusted, so that the thickness T, the width W, the radius of curvature, $R_1$ of the first region 131 of the curved part 12, the radius of curvature, $R_2$ of the second region 132 of the curved part 12, and the angle θ become the values illustrated in Table 2. Further, in the first axial rolling step, the extent of the pressing by the first rolling rollers 221 and 222 and the second rolling rollers 231 and 232 was adjusted, to adjust the hardness of the central portion of the steel wire that is obtained.

The steel wire was manufactured and evaluated in the same manner as in the experimental example 2-1, except for the above noted points.

The evaluation results are illustrated in Table 2.

Experimental Example 2-3

In the first axial rolling step and the second axial rolling step, the extent of the pressing and the extent of the rolling were adjusted, so that the thickness T, the width W, the radius of curvature, $R_2$ of the second region 132 of the curved part 12, and the angle θ become the values illustrated in Table 2. Further, in the first axial rolling step, the extent of the pressing by the first rolling rollers 221 and 222 and the second rolling rollers 231 and 232 was adjusted, to adjust the hardness of the central portion of the steel wire that is obtained. The curved part 12 was set to a curve having a constant radius of curvature, $R_2$ having the value illustrated in Table 2. That is, the radius of curvature, $R_1$ and the radius of curvature, $R_2$ satisfy a relationship $R_1=R_2$. The steel wire was manufactured and evaluated in the same manner as in the experimental example 2-1, except for the above noted points.

The evaluation results are illustrated in Table 2.

Experimental Example 3-1

The raw steel wire 21 having a wire diameter of 0.26 mm and a circular cross sectional shape, was used. In addition, in the first axial rolling step and the second axial rolling step, the extent of the pressing and the extent of the rolling were adjusted, so that the thickness T, the width W, the radius of curvature, $R_2$ of the second region 132 of the curved part 12, and the angle θ become the values illustrated in Table 2. Further, in the first axial rolling step, the extent of the pressing by the first rolling rollers 221 and 222 and the second rolling rollers 231 and 232 was adjusted, to adjust the hardness of the central portion of the steel wire that is obtained. The curved part 12 was set to a curve having a constant radius of curvature, $R_2$ having the value illustrated in Table 2. That is, the radius of curvature, $R_1$ and the radius of curvature, $R_2$ satisfy a relationship $R_1=R_2$. The steel wire was manufactured and evaluated in the same manner as in the experimental example 1-1, except for the above noted points.

The evaluation results are illustrated in Table 2.

Experimental Example 3-2 To Experimental Example 3-4

In the first axial rolling step and the second axial rolling step, the extent of the pressing and the extent of the rolling were adjusted, so that the thickness T, the width W, the radius of curvature, $R_1$ of the first region 131 of the curved part 12, the radius of curvature, $R_2$ of the second region 132 of the curved part 12, and the angle θ become the values illustrated in Table 2. Further, in the first axial rolling step, the extent of the pressing by the first rolling rollers 221 and 222 and the second rolling rollers 231 and 232 was adjusted, to adjust the hardness of the central portion of the steel wire that is obtained.

The steel wire was manufactured and evaluated in the same manner as in the experimental example 3-1, except for the above noted points.

The evaluation results are illustrated in Table 2.

Experimental Example 3-5

In the first axial rolling step and the second axial rolling step, the extent of the pressing and the extent of the rolling were adjusted, so that the thickness T, the width W, the radius of curvature, $R_2$ of the second region 132 of the curved part 12, and the angle θ become the values illustrated in Table 2. Further, in the first axial rolling step, the extent of the pressing by the first rolling rollers 221 and 222 and the second rolling rollers 231 and 232 was adjusted, to adjust the hardness of the central portion of the steel wire that is obtained. Similar to the experimental example 3-1, the curved part 12 was set to a curve having a constant radius of curvature, $R_2$ having the value illustrated in Table 2. That is, the radius of curvature, $R_1$ and the radius of curvature, $R_2$ satisfy a relationship $R_1=R_2$. The steel wire was manufactured and evaluated in the same manner as in the experimental example 3-1, except for the above noted points.

The evaluation results are illustrated in Table 2.

Experimental Example 4-1

The raw steel wire 21 having a wire diameter of 0.2 mm and a circular cross sectional shape, was used. In addition, in the first axial rolling step and the second axial rolling step, the extent of the pressing and the extent of the rolling were adjusted, so that the thickness T, the width W, the radius of curvature, $R_2$ of the second region 132 of the curved part 12, and the angle θ become the values illustrated in Table 2. Further, in the first axial rolling step, the extent of the pressing by the first rolling rollers 221 and 222 and the second rolling rollers 231 and 232 was adjusted, to adjust the hardness of the central portion of the steel wire that is obtained. The curved part 12 was set to a curved line having a constant radius of curvature, $R_2$ having the value illustrated in Table 2. That is, the radius of curvature, $R_1$ and the radius of curvature, $R_2$ satisfy a relationship $R_1=R_2$. The steel wire was manufactured and evaluated in the same manner as in the experimental example 1-1, except for the above noted points.

The evaluation results are illustrated in Table 2.

TABLE 1

|  | Experimental Example 1-1 | Experimental Example 1-2 | Experimental Example 1-3 | Experimental Example 1-4 | Experimental Example 1-5 | Experimental Example 1-6 | Experimental Example 1-7 |
|---|---|---|---|---|---|---|---|
| Radius of curvature, $R_1$ (mm) of first region | 0.05 | 0.149 | 0.149 | 0.025 | — | — | — |
| Radius of curvature, $R_2$ (mm) of second region | 0.2 | 0.2 | 0.2 | 0.2 | 0.2 | 0.2 | 0.2 |
| Angle θ (°) formed between linear part and curved part | 177.5 | 177.5 | 177.5 | 177.5 | 137.5 | 126.5 | 159.5 |
| Length (mm) of first linear portion, second linear portion | 0.306 | 0.125 | 0.125 | 0.330 | 0.327 | 0.348 | 0.514 |
| Width W (mm) | 0.490 | 0.490 | 0.490 | 0.490 | 0.490 | 0.602 | 0.400 |
| Thickness T (mm) | 0.308 | 0.308 | 0.308 | 0.308 | 0.306 | 0.250 | 0.380 |
| Aspect ratio T/W (%) | 62.9 | 62.9 | 62.9 | 62.9 | 62.4 | 41.5 | 95.0 |
| HV1 − HV2 (HV0.1) | −59.0 | −30.0 | 8.8 | −32.0 | −10.0 | −62.0 | 24.0 |
| Durability index | 118 | 119 | 119 | 96 | 100 | 100 | 116 |
| Weight index | 100 | 100 | 100 | 100 | 100 | 95 | 105 |
| Impact resistance index | 100 | 100 | 95 | 100 | 100 | 82 | 103 |

TABLE 2

|  | Experimental Example 2-1 | Experimental Example 2-2 | Experimental Example 2-3 | Experimental Example 3-1 | Experimental Example 3-2 | Experimental Example 3-3 | Experimental Example 3-4 | Experimental Example 3-5 | Experimental Example 4-1 |
|---|---|---|---|---|---|---|---|---|---|
| Radius of curvature, $R_1$ (mm) of first region | 0.1 | 0.025 | — | — | 0.08 | 0.10 | 0.04 | — | — |
| Radius of curvature, $R_2$ (mm) of second region | 0.15 | 0.15 | 0.15 | 0.13 | 0.13 | 0.13 | 0.13 | 0.13 | 0.1 |
| Angle θ (°) formed between linear part and curved part | 177.5 | 177.5 | 137.5 | 167.5 | 177.5 | 170.0 | 177.5 | 137.5 | 136.5 |
| Length (mm) of first linear portion, second linear portion | 0.165 | 0.240 | 0.261 | 0.220 | 0.160 | 0.203 | 0.200 | 0.230 | 0.280 |
| Width W (mm) | 0.370 | 0.370 | 0.370 | 0.320 | 0.320 | 0.320 | 0.320 | 0.320 | 0.245 |
| Thickness T (mm) | 0.231 | 0.231 | 0.231 | 0.200 | 0.200 | 0.200 | 0.200 | 0.200 | 0.150 |
| Aspect ratio T/W (%) | 62.4 | 62.4 | 62.4 | 62.5 | 62.5 | 62.5 | 62.5 | 62.5 | 61.2 |
| HV1 − HV2 (HV0.1) | −20.0 | −21.0 | −18.0 | −20.0 | −31.0 | −25.0 | −39.0 | −12.0 | −22.0 |
| Durability index | 102 | 94 | 100 | 100 | 103 | 102 | 96 | 95 | 98 |
| Weight index | 100 | 100 | 100 | 100 | 100 | 100 | 100 | 100 | 97 |
| Impact resistance index | 100 | 100 | 100 | 100 | 100 | 100 | 100 | 100 | 80 |

According to Table 1, the steel wire according to the experimental example 1-1 has the flat shape in the cross section perpendicular to the longitudinal direction, and satisfies a relationship in which the radius of curvature, $R_1$ of the first region is greater than or equal to 0.05 mm but less than 0.15 mm, the radius of curvature, $R_2$ of the second region is greater than or equal to 0.13 mm but less than or equal to 0.2 mm, and the angle θ is greater than or equal to 165 degrees. The steel wire according to the experimental example 1-1 had a durability index of 118, a weight index of 100, and an impact resistance index of 100, and it was confirmed that the steel wire can be used to form a tire having excellent lightweight properties and durability. The same tendencies were confirmed for the steel wire according to the experimental example 1-2. In the experimental example 1-3, the durability index was 119 and the weight index was 100, and it was confirmed that the steel wire can be used to form a tire having excellent lightweight properties and durability. However, the result for the impact resistance index was inferior to those of the experimental example 1-1 and the experimental example 1-2. It may be regarded this result was obtained because HV1−HV2 is 8.8HV0.1, and the hardness of the central portion of the steel wire is lower than the hardness of the surface side.

In the steel wire according to the experimental example 1-4, because the radius of curvature, $R_1$ of the first region was 0.025 mm, which is less than 0.05 mm, and the durability index was 96, it was confirmed that the result of the durability is inferior compared to those of the steel wires according to the experimental example 1-1 and the experimental example 1-2.

In addition, it was confirmed that the steel wires according to the experimental example 1-5 to the experimental example 1-7 in which the angle θ was less than 165 degrees, had a durability index of 100 to 116, and the results of the durability are inferior when compared to that of the steel wire according to the experimental example 1-1.

Because the steel wire according to the experimental example 1-6 had an aspect ratio having a small value, that is, was a flat steel wire, the weight index was 95 and relatively low. However, it was confirmed that the steel wire according to the experimental example 1-6 had an impact resistance index less than or equal to 90, which was significantly inferior, because a large amount of processing is required to increase the aspect ratio during the manufacturing.

Because the steel wire according to the experimental example 1-7 had an aspect ratio having a large value and the cross sectional shape of the steel wire is close to a circle, the durability index was 116 and relatively high. However, it was confirmed that the weight index was significantly inferior.

The same tendencies were observed in the experimental example 2-1 to the experimental example 2-3. The steel wire according to the experimental example 2-1 has the flat shape in the cross section perpendicular to the longitudinal direction, and satisfies a relationship in which the radius of curvature, $R_1$ of the first region is greater than or equal to 0.05 mm but less than 0.15 mm, the radius of curvature, $R_2$ of the second region is greater than or equal to 0.13 mm but less than or equal to 0.2 mm, and the angle θ is greater than or equal to 165 degrees. The steel wire according to the experimental example 2-1 had a durability index of 102, a weight index of 100, and an impact resistance index of 100, and it was confirmed that the steel wire can be used to form a tire having excellent lightweight properties and durability.

In the steel wire according to the experimental example 2-2, because the radius of curvature, $R_1$ of the first region was 0.025 mm, which is less than 0.05 mm, and the durability index was 94, it was confirmed that the durability is inferior compared to that of the steel wire according to the experimental example 2-1.

In addition, in the steel wire according to the experimental example 2-3 in which the angle θ was less than 165 degrees, the durability index was 100, and it was confirmed that the durability is inferior compared to that of the steel wire according to the experimental example 2-1.

The same tendencies were observed in the experimental example 3-1 to the experimental example 3-5. The steel wires according to the experimental example 3-1 to the experimental example 3-3 have the flat shape in the cross section perpendicular to the longitudinal direction, and satisfy a relationship in which the radius of curvature, $R_1$ of the first region is greater than or equal to 0.05 mm but less than 0.15 mm, the radius of curvature, $R_2$ of the second region is greater than or equal to 0.13 mm but less than or equal to 0.2 mm, and the angle θ is greater than or equal to 165 degrees. It was confirmed that the steel wires according to the experimental example 3-1 to the experimental example 3-3 had a durability index of 100 to 103, a weight index of 100, and an impact resistance index of 100.

On the other hand, in the steel wire according to the experimental example 3-4, the radius of curvature, $R_1$ of the first region was not in the range that is greater than or equal to 0.05 mm but less than 0.15 mm. In the experimental example 3-5, the angle θ was less than 165 degrees.

For this reason, it was confirmed that the steel wires according to the experimental example 3-1 to the experimental example 3-3 can be used to form a tire having excellent durability, when compared to the experimental example 3-4 and the experimental example 3-5.

In the experimental example 4-1, the radius of curvature, $R_2$ of the second region was not in the range that is greater than or equal to 0.13 mm but less than or equal to 0.2 mm, and the angle θ was not in the range that is greater than or equal to 165 degrees. For this reason, it was confirmed that the durability index and the impact resistance index of the steel wire according to the experimental example 4-1 were both lower than those of the steel wires according to the experimental example 3-1 or the like.

DESCRIPTION OF REFERENCE NUMERALS

10 Steel wire
101 Steel wire
102 Plating layer
11 Linear part
111 First linear portion
112 Second linear portion
$L_{111}$, $L_{112}$ Length
12 Curved part
121 First curved portion
122 Second curved portion
131 First region
132 Second region
14 Center line
1411 First end portion
1412 Second end portion
142 Surface-side measurement point
1421 First surface-side measurement point
1422 Second surface-side measurement point
143 Center measurement point
$L_{1421}$, $L_{1422}$, $L_{143}$ Distance
$R_1$, $R_2$ Radius of curvature
W Width
T Thickness
11A Tangential line
12A Tangential line
$P_{11\text{-}12}$ Connecting point
θ Angle
20 Rolling mill
21 Raw steel wire
221, 222 First rolling roller
231, 232 Second rolling roller
231A, 232A Groove
241, 242 Third rolling roller
241A, 242A Groove
A Arrow
30 Tire
31 Tread part
32 Sidewall part
33 Bead part
34 Inner liner
35 Carcass
36 Belt layer
37 Bead wire
CL Center line
41 Rubber
t1 First rubber thickness
t2 Second rubber thickness
50 Test piece
511 First roller
512 Second roller
513 Third roller
B Arrow 61 Hammer
62 Rotation axis
63 Sample
P1 Initial position
P2 Maximum height position
h1, h2 Height

The invention claimed is:

1. A steel wire comprising:
a cross section perpendicular to a longitudinal direction having a flat shape; and
an outer shape of the cross section including a pair of linear parts vertically opposing each other, and a pair of curved parts horizontally opposing each other and connecting the pair of linear parts, wherein:
each curved part of the pair of curved parts includes a pair of first regions located at positions connecting to the pair of linear parts, and a second region located at a position between the pair of first regions,
the pair of first regions and the second region located between the pair of first regions extend approximately vertically,
a radius of curvature, $R_1$ of each first region, of first regions is greater than or equal to 0.05 mm but less than 0.15 mm, and a radius of curvature, $R_2$ of the second region is greater than or equal to 0.13 mm but less than or equal to 0.2 mm, and
an angle θ between mutually adjacent linear part and curved part of the pair of linear parts and the pair of curved parts, connected via a first region of the pair of first regions, is greater than or equal to 165 degrees,
a thickness T of the steel wire is in a range of 0.200 mm to 0.308 mm,
the radius of curvature, $R_1$ and the radius of curvature, $R_2$ are different and satisfy a relationship $R_2 > R_1$, and
the radius of curvature, $R_2$ and the thickness T satisfy a relationship $R_2 <= T$.

2. The steel wire as claimed in claim 1, wherein, in the cross section,
two intersection points of a center line equidistant from the pair of linear parts, and the pair of curved parts, are defined as a first end portion and a second end portion,
two points on the center line, that are separated by 0.1 mm from the first end portion and the second end portion, respectively, are defined as surface-side measurement points,
a point on the center line, that is equidistant from the first end portion and the second end portion, is defined as a center measurement point, and
a difference between an average value HV1 of Vickers hardnesses at the two surface-side measurement points, and a Vickers hardness HV2 at the center measurement point, denoted by HV1-HV2, is greater than or equal to −60HV0.1 but less than or equal to −10HV0.1.

3. The steel wire as claimed in claim 1, wherein:
a width W of the steel wire is in a range of 0.32 mm to 0.52 mm, and
the radius of curvature, $R_2$, and the width W satisfy a relationship $R_2 < W$.

4. The steel wire as claimed in claim 1, wherein:
the radius of curvature, $R_1$ is in a range of 0.05 mm to 0.149,
the radius of curvature, $R_2$ is 0.2 mm,
the angle θ is 177.5 degrees,
a width W of the steel wire is 0.490 mm, and
the thickness T of the steel wire is 0.308 mm.

5. The steel wire as claimed in claim 1, wherein:
the radius of curvature, $R_1$ is in a range of 0.08 mm to 0.10,
the radius of curvature, $R_2$ is in a rage of 0.13 mm to 0.15 mm,
the angle θ is in a range of 170.0 degrees to 177.5 degrees,
a width W of the steel wire is in a range of 0.320 mm to 0.370 mm, and
the thickness T of the steel wire is in a range of 0.200 mm to 0.231 mm.

6. The steel wire as claimed in claim 1, further comprising:
a brass plating film including copper and zinc on a surface thereof.

7. The steel wire as claimed in claim 6, wherein the brass plating film further includes one or more kinds of elements selected from a group consisting of cobalt, nickel, iron, tin, and bismuth.

8. A tire comprising:
a belt layer including
a rubber, and
the steel wire according to claim 1, embedded in the rubber.

9. The tire as claimed in claim 8, wherein the steel wire has a brass plating film including copper and zinc on a surface thereof.

10. The tire as claimed in claim 8, wherein:
a width W of the steel wire is in a range of 0.32 mm to 0.52 mm, and
the radius of curvature, $R_2$, and the width W satisfy a relationship $R_2 < W$.

11. The tire as claimed in claim 8, wherein:
the radius of curvature, $R_1$ is in a range of 0.05 mm to 0.149,
the radius of curvature, $R_2$ is 0.2 mm,
the angle θ is 177.5 degrees,
a width W of the steel wire is 0.490 mm, and
the thickness T of the steel wire is 0.308 mm.

12. The tire as claimed in claim 8, wherein:
the radius of curvature, $R_1$ is in a range of 0.08 mm to 0.10,
the radius of curvature, $R_2$ is in a rage of 0.13 mm to 0.15 mm,
the angle θ is in a range of 170.0 degrees to 177.5 degrees,
a width W of the steel wire is in a range of 0.320 mm to 0.370 mm, and
the thickness T of the steel wire is in a range of 0.200 mm to 0.231 mm.

* * * * *